(12) United States Patent
Toval et al.

(10) Patent No.: US 11,113,720 B2
(45) Date of Patent: Sep. 7, 2021

(54) SYSTEM AND A METHOD FOR SURVEYING ADVERTISEMENTS IN MOBILE APPLICATIONS

(71) Applicants: Assaf Toval, Herzeliya (IL); Kfir Moyal, Tel-Aviv (IL)

(72) Inventors: Assaf Toval, Herzeliya (IL); Kfir Moyal, Tel-Aviv (IL)

( * ) Notice: Subject to any disclaimer, the term of this patent is extended or adjusted under 35 U.S.C. 154(b) by 0 days.

(21) Appl. No.: 16/859,895

(22) Filed: Apr. 27, 2020

(65) Prior Publication Data

US 2020/0258117 A1 Aug. 13, 2020

Related U.S. Application Data

(63) Continuation of application No. 15/412,050, filed on Jan. 22, 2017, now Pat. No. 10,672,026.

(60) Provisional application No. 62/289,260, filed on Jan. 31, 2016.

(51) Int. Cl.
*G06Q 30/02* (2012.01)
*G06Q 20/18* (2012.01)
*G06Q 50/18* (2012.01)

(52) U.S. Cl.
CPC ..... *G06Q 30/0244* (2013.01); *G06Q 30/0267* (2013.01); *G06Q 50/184* (2013.01)

(58) Field of Classification Search
CPC ........................... H04B 7/15542; G06F 3/048
See application file for complete search history.

(56) References Cited

U.S. PATENT DOCUMENTS

| 10,438,243 B1* | 10/2019 | Hapgood | G06F 16/9566 |
| 2015/0185825 A1* | 7/2015 | Mullins | G06F 3/048 345/633 |
| 2015/0189652 A1* | 7/2015 | Mizusawa | H04B 7/15542 370/280 |
| 2017/0221092 A1 | 8/2017 | Toval et al. | |

* cited by examiner

*Primary Examiner* — Saba Dagnew
(74) *Attorney, Agent, or Firm* — Smith Tempel Blaha LLC; Gregory Scott Smith (57) ABSTRACT

A method and a system for monitoring an advertisement presented within a mobile application, including: simulating a virtual user interacting with the mobile application, tracing in real-time executable code of the mobile application that processes an advertisement. Where this traced process of advertisement performs: negotiating advertisement display, communicating an advertisement, and displaying an advertisement. The system then directs the advertisement negotiation via a proxy server emulating a location of the virtual user. The system then detects within the process of advertisement an advertisement processed by the executable code. The system then records the advertisement as displayed, and parameters associated with the advertisement.

26 Claims, 4 Drawing Sheets

SYSTEM AND A METHOD FOR SURVEYING ADVERTISEMENTS IN MOBILE APPLICATIONS

FIELD

The method and apparatus disclosed herein are related to surveying advertisements embedded in software programs (applications) and, more particularly but not exclusively, to surveying advertisements provided via the Internet to mobile applications.

BACKGROUND

Personalized advertisement in the Internet is well known in the art. Personalized advertisement adapts the advertisement presented to a user visiting a web page to the characteristics of the particular user. Therefore, when surfing the Internet and visiting various web pages, different users would be presented with different advertisements. A typical web page has one or more advertising placeholders. When the page is accessed by a visiting user the advertisement placeholders are automatically auctioned between advertisers. If no advertisement is placed, the auctioneer—the advertisement exchange agent—forwards the placeholder to another auctioneer. The placeholder can be transferred between several auctioneers before an advertisement is placed.

Internet advertisement surveys study the offering of advertisements presented to various users. The advertisement survey enables the advertiser to understand how a user experiences Internet advertising and the impact of a particular ad in view of the overall offering of advertisements. An advertisement survey is therefore focused on the relative impact of a particular advertisement. However, Internet advertisement surveys do not track the way advertisements are placed, and therefore the advertiser lacks information as to how to increase the impact and efficiency of his advertisement budget.

Many software programs, also named applications, are provided to users free of charge, but carry advertisements. The advertisements are placed within the user interface of the application in a manner similar to the web-page advertising described above. An advertisement place-holder embedded in the software program (application) is auctioned by an auctioneer among a plurality of advertisers.

Typically, the developer of an application, such as a software program executed by a mobile device such as a mobile telephone, a tablet, etc., embeds in the application a software development kit (SDK) provided by an Ad Network (also known as an advertisement exchange agent, ad bidding agent, auctioneer, etc.). The SDK may be embedded in various parts of the applications. When the user access the screen display carrying the SDK the SDK communicates with the Ad Network which initiates a bid among advertisers and eventually places an advertisement in the ad placeholder associated with the SDK. While offering the particular placeholder for bidding the Ad Network provides information about the application, the user, and various other relevant parameters.

This complex process takes less than a second and may repeat several time while the user is using the application. The advertiser needs to know how effective the advertisement campaign is, and how it compares with other campaigns. There is thus a widely recognized need for, and it would be highly advantageous to have, a method and a system for surveying advertisements placed in applications, devoid of the above limitations.

SUMMARY

According to one exemplary embodiment there is provided a method and a system for monitoring an advertisement presented within a mobile application, including: tracing, in real-time, executable code of a mobile application, the mobile application being configured for processing by a processor of a mobile communication device, where the executable code is configured to process at least one advertisement, where the process of advertisement includes any of: negotiating advertisement display, communicating an advertisement, and displaying an advertisement, detecting within the process of advertisement an advertisement processed by the executable code, and recording the advertisement as displayed, and/or parameters associated with the advertisement.

According to yet another exemplary embodiment there is provided a method, a device, and a computer program where the mobile application is executed by a processor of a computer which is not the mobile communication device.

According to still another exemplary embodiment there is provided a method, a device, and a computer program including: providing a mobile application configured to execute in a mobile computing device, providing an emulation module configured to execute on a server computing device connected to a communication network, where the emulation module is configured to perform the steps of: emulating the mobile computing device, emulating an operating system of the mobile computing device, executing the mobile application, and collecting advertisement data processed by the mobile application, and providing an monitoring module configured to execute on the server computing device, the monitoring module configured to perform: receiving the advertisement data from the emulation module, and/or recording: the advertisement as displayed, and/or parameters associated with the advertisement.

According to yet another exemplary embodiment there is provided a method, a device, and a computer program where the step of recording includes storing the advertisement as displayed, and/or parameters associated with the advertisement, outside the mobile communication device.

Further according to another exemplary embodiment there is provided a method, a device, and a computer program additionally including: intercepting communication of the mobile application, and logging communication of the mobile application.

Still further according to another exemplary embodiment there is provided a method, a device, and a computer program additionally including where the communication of the mobile application includes communication with an ad-network server.

Yet further according to another exemplary embodiment there is provided a method, a device, and a computer program additionally including analyzing the communication of the mobile application to form advertisement data.

Even further according to another exemplary embodiment there is provided a method, a device, and a computer program where the step of analyzing the log to form advertisement data includes detecting an alphanumeric character string.

Additionally, according to another exemplary embodiment there is provided a method, a device, and a computer program additionally including where the alphanumeric character string includes "VASTdata".

According to yet another exemplary embodiment there is provided a method, a device, and a computer program where the step of executing the mobile application includes the step of simulating user activity.

According to still another exemplary embodiment there is provided a method, a device, and a computer program for presenting advertisement data to a user, the method including: receiving, from the user: at least one mobile software application, where the mobile software application is operative to be used by a mobile user in a mobile communication device, and/or at least one advertisement type operative for view by a mobile user of a mobile software application, where the mobile software application is operative to be used by the mobile user in a mobile communication device, presenting to the user advertisement data associated with a plurality of advertisements, where each of the advertisements is collected using the steps of: executing the mobile application on a server computing device connected to a communication network, tracing, in real-time, executable code of the mobile application, while the mobile application is being executed, where the executable code is configured to process at least one advertisement, where the processing includes the steps of: negotiate advertisement display, and/or communicate an advertisement, and/or display an advertisement, detecting an advertisement processed by the executable code, and recording the advertisement as displayed, and/or parameters associated with the advertisement.

Further according to yet another exemplary embodiment there is provided a method, a device, and a computer program for monitoring advertisements including: a computation module configured to process a mobile application, the mobile application being configured for processing by a processor of a mobile communication device, a tracing module configured to trace in real-time executable code of the mobile application, where the executable code is configured to process at least one advertisement, where the process of advertisement includes the steps of: negotiating advertisement display, and/or communicating an advertisement, and/or displaying an advertisement, an advertising detection module configured to detect within the process an advertisement processed by the executable code, and a recording module configured to record the advertisement as displayed, and/or parameters associated with the advertisement.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of embodiments disclosed blow involves performing or completing certain selected tasks or steps manually, automatically, or any combination thereof. Moreover, according to actual instrumentation and equipment of preferred embodiments of the method and system presented herein several selected steps could be implemented by hardware or by software on any operating system of any firmware or any combination thereof. For example, as hardware, selected steps could be implemented as a chip or a circuit. As software, selected steps could be implemented as a plurality of software instructions being executed by a computer using any suitable operating system. In any case, selected steps of the method and system disclosed herein could be described as being performed by a data processor, such as a computing platform for executing a plurality of instructions.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings.

DESCRIPTION OF EMBODIMENTS

The principles and operation of a method and a system for surveying advertisements embedded in software programs (applications) according to some embodiments may be better understood with reference to the drawings and accompanying description.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different drawings may use different scales and different scales can be used even within the same drawing, for example different scales for different views of the same object or different scales for the two adjacent objects.

The present embodiments comprise a method and a system for surveying advertisements embedded in software programs (applications) and, more particularly but not exclusively, to surveying advertisements provided via the Internet to mobile applications. In other words, present embodiments comprise a method and a system for collecting and analyzing the advertisement bidding-chain performed by an application.

In this document the term 'computing device' may refer to any type of computing machine, including but not limited to, a computer, a portable computer (e.g. a laptop computer), a mobile communication device, a network server, etc., and any combination thereof. The term 'mobile communication device" may refer to devices such as a tablet, a mobile telephone, a smartphone, etc. Such computing device or computing machine may include any type or combination of devices, including, but not limited to, a processing device, a memory device, a storage device, and/or a communication device. The term 'mobile computing device' or 'mobile device' may refer to any type of mobile or portable computing machine such as a laptop computer, a tablet, a mobile telephone, and particularly a smartphone.

The term 'communication network' or 'network' may refer to any type or technology for digital communication including, but not limited to, the Internet, WAN, LAN, MAN, PSDN, wireless networking technology such as PLMN, cellular network, WiMAX, WLAN (Wi-Fi), WPAN (Bluetooth), etc. The term 'communication network' or 'network' may refer to any combination of communication technology, and to any combination of physical networks. The term 'communication network' or 'network' may refer to any number of interconnected communication networks that may be operated by one or many network operators.

The term 'network operator' may refer to an entity or business providing communication services to other entities, users, subscribers, and network terminal devices such as computing device. A network operator includes, but is not limited to, a telecom carrier, cellular operator, a Wi-Fi network, etc.

The term 'application' may refer to a software program running on, or executed by, one or more computing devices, and particularly by a mobile computing device such as a mobile telephone, a tablet, a smartphone, etc., as well as any other mobile or portable computing facility. The term 'mobile application' may refer to an application executed by a mobile computing device.

The term 'advertising' or 'advertisement' refers to content provided by a third party to a user of an application. An advertisement may be provided to the user in any sensible form such as sound, text, image, video, etc., and combinations thereof. In this sense, for example, the advertisement is provided to the user by the application within the application's screen display, or sound track, or any similar medium used by the application.

The term 'advertisement placeholder' (or ad placeholder) refers to a place within an application, and particularly to an area within a screen display of an application, that may receive an advertisement, or in which an advertisement may be placed. An 'advertisement placeholder' may be associated with, or include, a bidding code.

The term 'bidding code' may refer to a piece of software, or program, embedded in the application for the particular ad placeholder. The bidding-code may also be known as software development kit (SDK). Therefore, for example, meaning of 'the advertisement is provided to the user by the application' as stated above refers to the SDK embedded within the application and presenting the advertisement to the user.

Typically, the bidding-code communicates with a bidding agent, which may also be known as an Ad Network or an ad-exchange. The bidding agent may represent many advertisers, advertising agencies, and/or advertisements. The bidding agent operates a set of rules to place bids for advertisements until one of the advertisements wins the bid for the particular ad placeholder, or until no advertisements wins the bid. The bidding-code may then communicate with another bidding agent until a bid is won, or not.

The term 'advertising bidding' refers to online bidding and/or real-time bidding for advertisement placement in a particular advertising placeholder visited by a particular user. The term advertising bidding-chain refers to the sequence, or the order, in which bidders and advertisements participate in the bidding, until a bid is won by a particular participant (i.e. bidder) for a particular advertisement.

A goal of the embodiment is to survey, collect, gather and provide information associated with advertisements placed in applications. The information may include listing the advertisements presented to users, listing the applications presenting the advertisements, listing the types of users presented with particular advertisements, share-of-voice of particular advertisements, bidding-chain information, etc. The embodiment may also provide statistics and correlations associated with the information surveyed and collected. The embodiment may also provide a method and a system for executing such survey and providing the necessary information.

Figure 1:
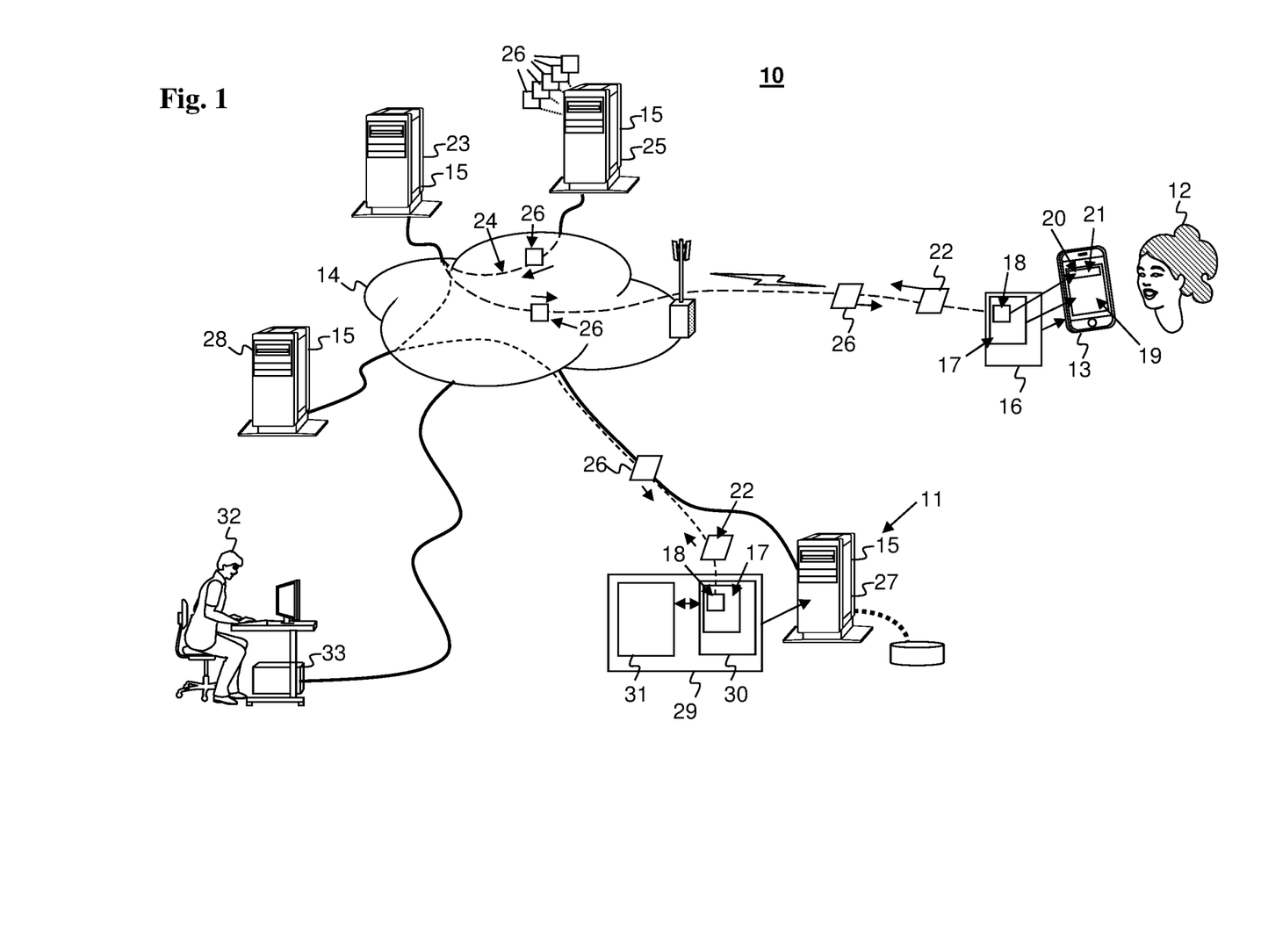
FIG. 1 is a simplified illustration of a mobile advertising survey environment with a mobile advertising survey system for analyzing the mobile advertisements.

Reference is now made to FIG. 1, which is a simplified illustration of a mobile advertising survey environment 10 with a mobile advertising survey system 11 for analyzing the mobile advertisements, according to one embodiment.

FIG. 1 shows a first user 12 using a computing device 13, for example, a mobile telephone or a smartphone. Computing device 13 is communicatively coupled to a communication network 14. Communication network 14 is communicatively coupled to a variety of network servers 15.

Computing device 13 may include a processor (not shown in FIG. 1) that may execute an operating system 16 and may also execute an application 17 typically running over operating system. Application 17 may include one or more advertisement bidding codes 18 that may also be executed by the processor of computing device 13. It is appreciated that computing device 13 may include several different applications 17, and that each application 17 may include several and/or different advertisement bidding codes 18.

FIG. 1 shows first user 12 using application 17. Application 17 displays content 19 on the display screen of computing device 13. Application 17 also includes a placeholder 20 associated with a respective advertisement bidding code 18, which displays an advertisement content 21 on the display screen of computing device 13.

It is appreciated that content 19 may include any type and combination of sensory content such as image, sound, text, etc., and that the term 'display' may represent other means of providing content to a human including, but not limited to' an earphone, a speaker, etc.

When user 12 reaches the particular part of application 17, application 17 activates the advertisement bidding code 18 associated with the particular placeholder. The advertisement bidding code 18 communicates with the Ad Network by sending an ad call 22 to Ad Network server 23. While FIG. 1 shows only one Ad Network server 23, it is appreciated that Ad Network server 23 of FIG. 1 may represent a plurality of Ad Network servers 23. It is appreciated that ad call 22 may represent a plurality, and/or a sequence, of ad calls 22 that may be exchanged between the advertisement bidding code 18 and the respective ad network server 23.

Ad Network server 23 initiates an automatic real-time bidding process 24 among advertisers servers 25 (for simplicity, only one advertiser server 25 is shown). While offering the particular placeholder for bidding the Ad Network provides information about the application, the user, and various other relevant parameters. Typically, bidding process 24 ends with an advertisement data 26 being sent to application 17 and presented to user 12 as advertisement content 21 on the display of computing device 13, in the ad placeholder 20 associated with the particular advertisement bidding code 18.

Ad call 22 may contain detailed information about the computing device 13, the operating system 16 used by the computing device 13, the communication network 14 used by the computing device 13 and its network operator, etc.

Ad call 22 may contain detailed information about the application 17 currently used by user 12, including identification of the application, identification of the type of the application (basic, advance, professional, etc.). Ad call 22 may also contain information about, or associated with, or characterizing, the particular place in application 17 currently visited by the user such as game level played, etc.

Ad call 22 may also contain information associated with the use of application 17, such as data entered or selected by the user or provided to the user via application 17. For example, assuming that application 17 is a navigation application, such information may include GPS data of the navigation target, a commercial characterization of the navigation target, etc.

Ad call 22 may also contain detailed information about user 12, including but not limited to age, sex, current location (e.g., from GPS measurements or base station location), history of using computing device 13, history of accessing Internet content, etc.

All such information provided in the ad call 22 may be referred herein as personal data, which is typically associated with and/or characterizing user 12.

Ad Network server 23 may execute bidding process 24 using any of the information provided by Ad call 22. Advertising servers 25 may consider the information provided by Ad call 22 when bidding for the particular placeholder 20. Different advertising servers 25 may participate in each bidding event. Therefore different users of the same application may receive different advertisements, the same user using different applications may receive different advertisements, and even the same user using the same applications may receive different advertisements at different time, location, etc.

The goal of the advertising survey system 11 is to measure and analyze the actual distribution of advertisement content 21 among the various users according to the various personal data characterizing the distribution of the users 12.

As shown in FIG. 1, advertising survey system 11 may include one or more surveying servers 27 communicatively coupled to communication network 14. Surveying server 27 may also be communicatively coupled to one or more Ad network servers 23 via communication network 14. Typically, surveying server 27 may also be communicatively coupled to one or more Ad Network servers 23 via one or more proxy servers 28 providing locality information and/or representation.

As shown in FIG. 1, surveying server 27 may include a processor (not shown in FIG. 1) that may execute a server operating system 29, an emulation software program 30, one or more applications 17, one or more advertisement bidding codes 18, and advertisement monitoring software program 31.

As shown in FIG. 1, advertisement bidding codes 18 executed by surveying server 27 exchange ad calls 22 and advertisements 26 with network servers 23, typically via proxy servers 28.

As also shown in FIG. 1, a second user 32 using computational device 33 communicatively coupled to advertising survey system 11, typically via communication network 14 may access the results of the advertising surveys executed by advertising survey system 11.

Figure 2:
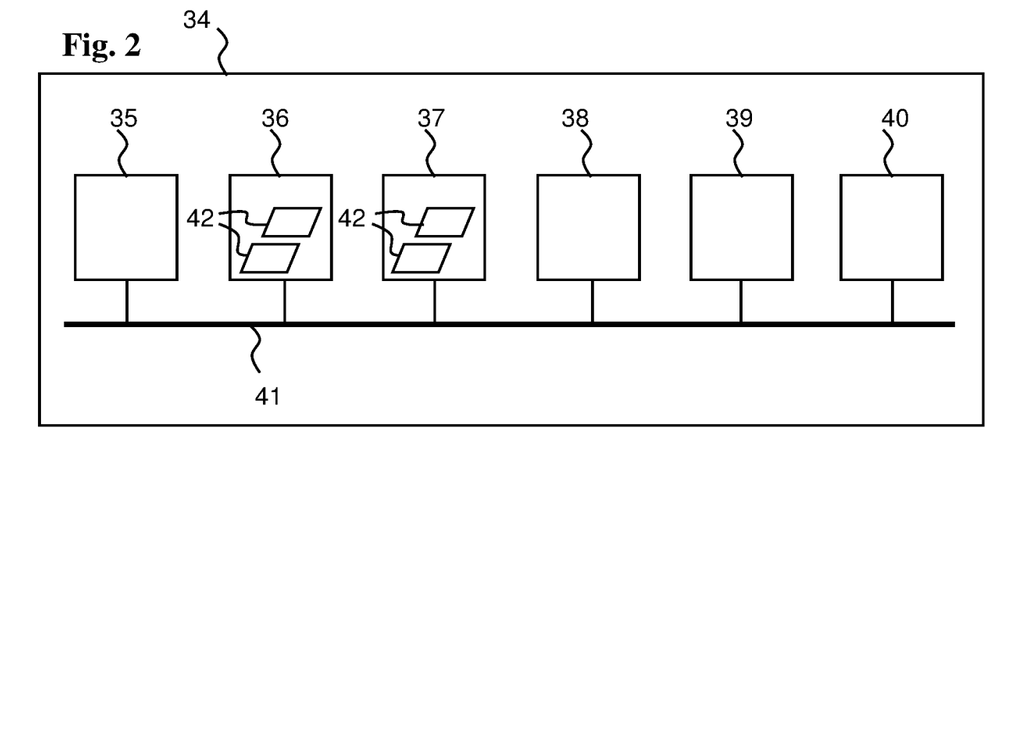
FIG. 2 is a simplified block diagram of computing device.

Reference is now made to FIG. 2, which is a simplified block diagram of computing device 34, according to one embodiment.

As an option, the block diagram of computing device 34 of FIG. 2 may be viewed in the context of the details of the previous Figures. Of course, however, the block diagram of computing device 34 of FIG. 2 may be viewed in the context of any desired environment. Further, the aforementioned definitions may equally apply to the description below.

It is appreciated that advertising survey system 11, and particularly surveying server 27, may be embodied as one or more computing devices 34. Computing devices 34 can therefore be a network server 15, or a part of a network server 15, or a plurality of network servers 15, or a datacenter, including cloud-based infrastructure.

Computing device 34 is operative to provide computing infrastructure and resources for any type and/or instance of software component executed within advertising survey environment 10, and particularly advertising survey system 11. In this regard computing device 34 is operative to process any of the processes described herein.

As shown in FIG. 2, computing device 34, may include the following components:

At least one processor unit 35 operative to execute one or more software programs as disclosed with reference to FIG. 1.

One or more memory units 36, e.g. random access memory (RAM), a non-volatile memory such as a Flash memory, etc., operative to store software programs, parameters, data, databases, etc.

One or more storage units 37 including, for example, a hard disk drive and/or a removable storage drive, representing a floppy disk drive, a magnetic tape drive, a compact disk drive, etc. The removable storage drive reads from and/or writes to a removable storage unit in a well-known manner. The storage units being operative to store software programs, parameters, data, databases, etc.

One or more communication units 38 operative to communicatively couple computing device 34 to at least one communication network 14 as disclosed herein and in FIG. 1.

One or more graphic processors 39 and displays 40 operative to enable a user to operate and control computing device 34 and software programs executed by computing device 34.

One or more communication buses 41 connecting the above units.

One or more computer programs 42, or computer control logic algorithms, which may be stored in any of the memory units 36 and/or storage units 37. Such computer programs, when executed, enable computing device 34 to perform various functions (set forth herein, for example). Memory units 36 and/or storage units 37 and/or any other storage are possible examples of tangible computer-readable media.

It is appreciated that any of server operating system 29, emulation software program 30, applications 17, advertisement bidding codes 18, and advertisement monitoring software program 31 of FIG. 1, may be embodied as a computer program 42 of FIG. 2.

Figure 3:
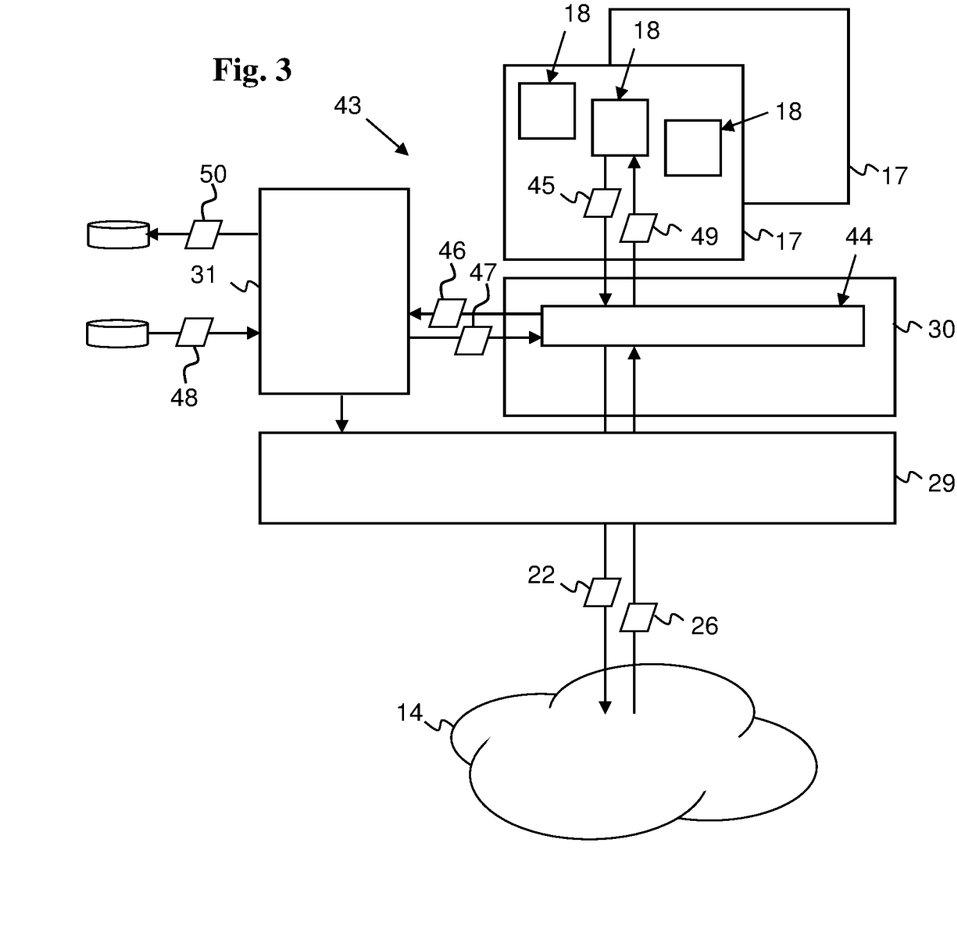
FIG. 3 is a block diagram of the software system of advertising survey system and/or surveying server.

Reference is now made to FIG. 3, which is a block diagram of the software system 43 of advertising survey system 11 and/or surveying server 27, according to one exemplary embodiment.

As an option, the block diagram of FIG. 3 may be viewed in the context of the details of the previous Figures. Of course, however, the block diagram of FIG. 3 may be viewed in the context of any desired environment. Further, the aforementioned definitions may equally apply to the description below.

As shown in FIG. 3, software system 43 of advertising survey system 11 and/or surveying server 27 may include a server operating system 29, an emulation software program 30 running over server operating system 29, one or more applications 17 running over emulation software program 30, one or more advertisement bidding codes 18 embedded in each of applications 17. One or more monitoring modules 44 may be embedded in emulation software program 30. A monitoring software program 31 is communicatively coupled with monitoring modules 44.

Emulation software program 30 may emulate the hardware and/or processing environment of a particular type of computing device 13. Emulation software program 30 may also emulate a particular type and release of operating system 16 operative on the particular type of computing device 13. Therefore, emulation software program 30 may emulate, for example, the computing device 13 of FIG. 1.

Emulation software program 30 may therefore enable the processor of advertising survey system 11 and/or surveying server 27 to execute an application 17 even though the hardware of surveying server 27 is not the hardware of computing device 13, and the server operating system 29 of advertising survey system 11 is not the operating system 16 of computing device 13.

For example, emulation software program 30 for many computing device 13 executing Android operating system 16 may be available from Genymotion, 36 boulevard Sebastopol, Paris 75004, France.

As shown in FIG. 3, when running on surveying server 27, application 17 communicates with the world via emulation software program 30 and via server operating system 29 (instead of via operating system 16). Particularly, advertisement bidding codes 18 embedded in application 17 communicate with one or more Ad Network server 23 (not shown in FIG. 3), via emulation software program 30 and via server operating system 29.

One or more monitoring modules 44 embedded in emulation software program 30 may monitor, and/or trace, and/or intercept communications 45 of the advertisement bidding codes 18. Such one or more monitoring modules 44 may then communicate to the monitoring software program 31, in real time, communications 46, including, for example, data extracted from the monitored, tracked and/or intercepted communications of any of the advertisement bidding codes 18.

Communications 45 of the advertisement bidding codes 18 may include communications between advertisement bidding codes 18 and internal services of computing device 13 such as the emulated operating system of the computing device 13. Particularly, an advertisement bidding codes 18 may interrogate the operating system of computing device 13 for various personal data characterizing the emulated computing device 13 and/or a user using the emulated computing device 13.

Communications 45 of the advertisement bidding codes 18 may include communications between advertisement bidding codes 18 and one or more Ad Network servers 23. Such communications 45 of the advertisement bidding codes 18 may include ad calls 22 sent to such Ad Network servers 23, and/or advertisements 26 received from such Ad Network servers 23.

Therefore, the emulation software program 30 in combination with the monitoring modules 44 embedded in emulation software program 30 may be configured to at least: emulate the mobile computing device, emulate an operating system of the mobile computing device, execute a mobile application, and monitor, trace and/or intercept communication of advertisement bidding codes 18 executed as part of the mobile application and particularly communication between at least one advertisement bidding code 18 and the emulated operating system and/or an Ad Network server 23.

Responsive to communications 46, the monitoring software program 31 may communicate to one or more of the monitoring modules 44 communications 47. Such communications 47 may include, for example, various personal data (48) characterizing the emulated computing device 13 and/or an emulated user using the emulated computing device 13. The monitoring modules 44 may then communicate data carried by communications 47 to the respective advertisement bidding code 18, for example, in the form of one or more communications 49. The respective advertisement bidding code 18 may then, for example, communicate the data provided by the monitoring software program 31 to an Ad Network server 23, for example, in the form of an ad call 22.

Monitoring software program 31 may also instruct server operating system 29 how to manage various operations of the applications 17 and/or advertisement bidding code 18, and particularly how to communicate an ad call 22. For example, Monitoring software program 31 may also instruct server operating system 29 to communicate an ad call 22 via a particular proxy server 28, and/or via a particular network operator, etc.

Therefore, advertising survey system 11 may control the information provided by the advertisement bidding code 18 to the Ad Network server 23, for example, in the form of an ad call 22, and thus emulate any particular type of computing device 13, operating system 16, and/or user 12. Advertising survey system 11 may also emulate the location of the emulated user, for example, by controlling the IP address presented to the Ad Network server 23 by selecting a particular proxy server 28, and/or by selecting a particular network operator, and/or by presenting emulated GPS data, etc.

Monitoring software program 31 may also collect advertisement data processed by the mobile application 17, for example by receiving from monitoring modules 44 data included in advertisements 26 monitored, and/or traced, and/or intercepted by monitoring modules 44.

One or more monitoring modules 44 embedded in emulation software program 30 may monitor, and/or trace, and/or intercept communications 45 between advertisement bidding codes 18 and the operating system emulated by the emulation software program 30 in which the advertisement bidding codes 18 provides a particular advertisements 26 to the emulated user. Such action of providing an advertisement 26 to the emulated user may include text, sound, image, video, etc., provided in a particular form adapted to the particular computational device and operating system emulated by the emulation software program 30.

The monitoring modules 44 monitoring, trace, and/or intercepting such communication 45 may record (50) the particular advertisement 26 as provided to the emulated user. For example, the monitoring modules 44 monitoring, tracing, and/or intercepting such communication 45 may record the particular advertisement 26 as displayed on the display of the computing device emulated by the emulation software program 30. The term display herein refers to any type of content provided to the emulated user, including, but not limited to, text, image, graphics, still picture, video, sound, etc.

Therefore, the advertisement monitoring software program 31, in combination with the monitoring modules 44 embedded in emulation software program 30, may be additionally configured to at least: receive and record the advertisement content, data, and metadata, the advertisement as displayed, and parameters associated with the advertisement.

Therefore, advertisement monitoring software program 31, in combination with the monitoring modules 44 embedded in emulation software program 30, may be additionally configured to emulate various types of information that an application 17 may provide, for example via an ad call 22 to an Ad Network servers 23 and then receive and record an advertisement sent by the Ad Network servers 23 to application 17.

It is appreciated that advertisement monitoring software program 31 may emulate a user (emulated user), including the computational device, its operating system, the location of the user and/or computational device, etc. (e.g., the personal data as described above). It is appreciated that advertisement monitoring software program 31 may emulate detailed characteristics and behavior of the characteristics of user and the computational device, etc.

Such detailed characteristics and behavior may include detailed information about the computing device 13, the operating system 16 used by the computing device 13, the communication network 14 used by the computing device 13 and its network operator, etc. Detailed information about the application 17 currently used by user 12, including identification of the application, identification of the type of the application (basic, advance, professional, etc.). Information about, or associated with, or characterizing, the particular place in application 17 currently visited by the user such as game level played, etc. Information associated with the use of application 17, such as data entered or selected by the user or provided to the user via application 17. Information about user 12, including but not limited to age, sex, current location (e.g., from GPS measurements or base station location), history of using computing device 13, history of accessing Internet content, etc.

Hence, advertisement monitoring software program 31, in combination with emulation software program 30 and the monitoring modules 44 embedded therewith, may be additionally configured to emulate a particular user (emulated user) using a particular computational device (emulated computational device) and using an application 17 to invoke advertisement bidding codes 18, produce ad calls 22 according to research requirements, and record advertisements 26 as received from respective Ad Network servers 23.

Figure 4:
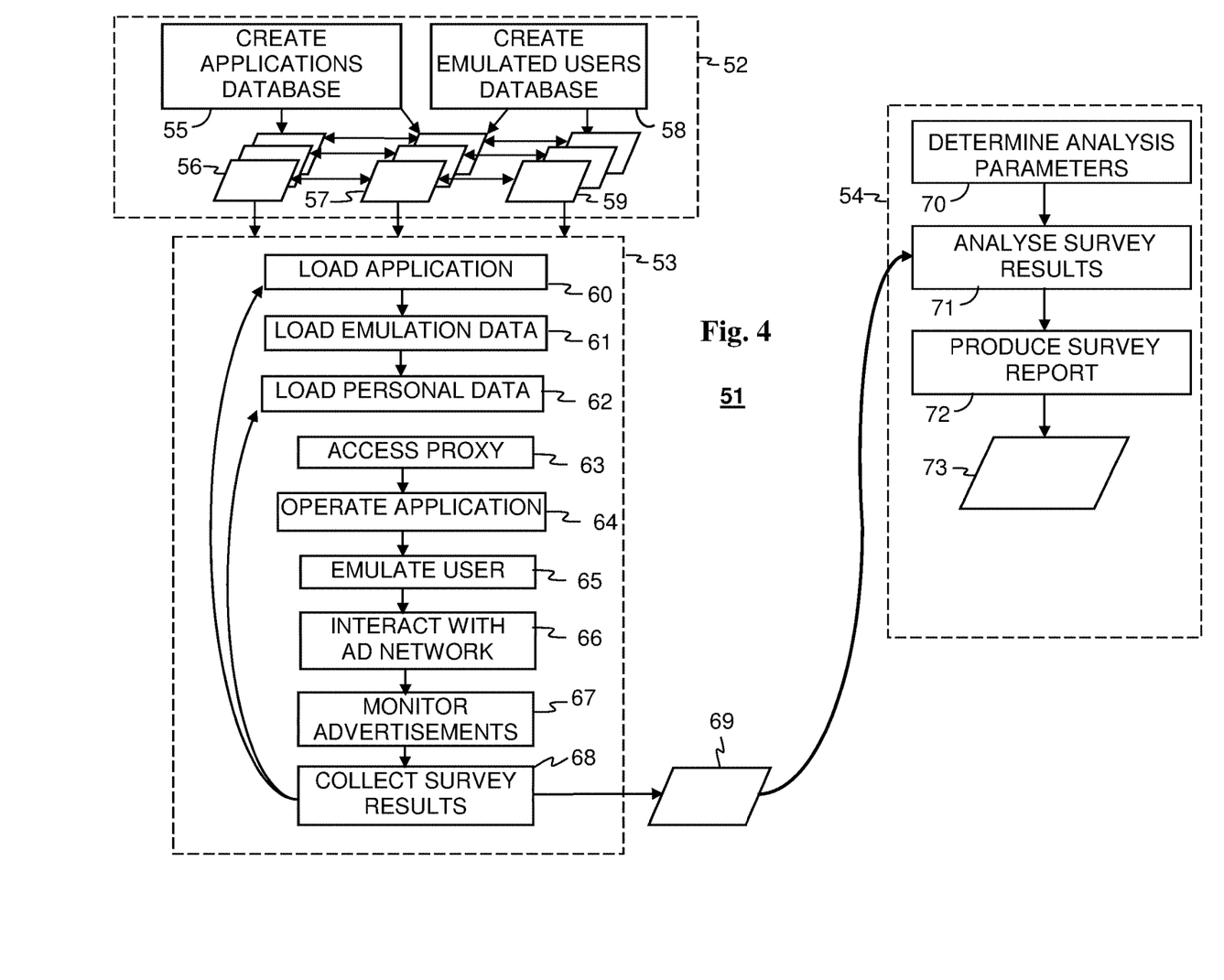
FIG. 4 is a simplified flow chart of an advertising research procedure.

Reference is now made to FIG. 4, which is a simplified flow chart of an advertising research procedure 51, according to one exemplary embodiment.

As an option, the flow chart of advertising research procedure 51 of FIG. 4 may be viewed in the context of the details of the previous Figures. Of course, however, the flow chart of advertising research procedure 51 of FIG. 4 may be viewed in the context of any desired environment. Further, the aforementioned definitions may equally apply to the description below.

As shown in FIG. 4, advertising research procedure 51 may include the following main module:
Database creation module 52.
Survey module 53.
Analysis and reporting module 54.

Database creation module 52 may be operated by a research user such as 32 of FIG. 1 to define how a survey should be executed. In step 55, database creation module 52 may enable the research user to produce an application list, or an application database, 56 of applications 17 for survey. Typically, application record in the applications database 56 may include the application 17 as well as its operational environment as disclosed above, including associated emulation data 57.

Emulation data 57 may include the information required to operate the particular application 17 in surveying server 27. For example, emulation data 57 may include the emulation software program 30 (or an identification of the emulation software program 30), monitoring modules 44, etc.

In step 58, database creation module 52 may also enable the research user to produce a personal-data list, or emulated-users' personal-data database, 59 of one or more types of emulated users, for example, emulating user 12.

Personal-data is used by surveying server 27, or by advertising research procedure 51, to emulate one or more users such as user 12, using a particular type of computing device 13 equipped with a particular type and release of operating system 16, using a particular application 17 in a particular location. Personal-data may therefore include any information used by an advertisement bidding codes 18 when presenting the user to an Ad Network server 23.

Such personal-data may therefore include gender, age or age range, level of education, income, salary or any other socio-economical characterization, fields of interests, etc. Personal-data may also include user-characteristics associated with the particular application 17 used such as level of playing a game, points gathered using the application, amount of money spent using the application, etc. Personal-data may also include characteristics of the emulated computing device such as screen size, access network speed (bit rate), etc.

It is appreciated that records of personal-data database 59, emulation data 57, and application database 56 may be associated to form, for example, any combination of emulated type of user, using any particular application, using any particular emulation data.

Survey module 53 may be operated by a survey-operating user such as 32 of FIG. 1. The survey-operating user may select or create a collection of survey parameters. Such survey parameters may include any collection of one or more combinations of emulated user types, applications, and emulation data. The survey-operating user may then instruct the surveying server 27, or advertising research procedure 51, to execute a survey with the selected parameters.

Survey module 53 may then load an application (step 60) identified within the survey parameters, load emulation data (step 61) as identified within the survey parameters, and load personal-data (step 62) as identified within the survey parameters.

Survey module 53 may then proceed to step 63 to access a proxy server, such as proxy server 28 of FIG. 1, to emulate a particular location, and or a particular cellular network (e.g., a cellular telephony service provider).

Survey module 53 may then proceed to step 64 to operate a selected application 17 according to selected emulation data 57, and to emulate the use of the application (step 65) by an emulated-user according to the selected personal-data 59.

Survey module 53 may then proceed to step 66 to interact with an ad-network such as an Ad Network server 23 of FIG. 1, and to step 67 to monitor the interaction of application 17 with the ad-network. Typically, monitoring software program 31 of FIG. 3 uses monitoring modules 44 to monitor the communication of advertisement bidding code 18 embedded in application 17 with the Ad Network server 23, for example via communications 46. Typically, monitoring software program 31 emulates the user of application 17 by presenting the selected personal-data 59 via communications 47.

Therefore, using monitoring modules 44 as described above, step 67 may monitor, in real-time, executable code of mobile application 17. Advertising research procedure 51, via Step 67 of survey module 53, typically monitors this executable code when negotiating advertisement display with the ad-network, when communicating an advertisement, and when displaying an advertisement.

Survey module 53 may then proceed to step 68 to collect and store the results 69 of the monitoring. The results may include all the information exchanged with the ad-network, including but not limited to, advertisements as displayed, and parameters associated with advertisements.

Steps 62 to 68 may be repeated for all the selected types of users (personal-data 59). Steps 60 to 68 may be repeated for all the selected applications 17*m* as well as the selected emulation data 57.

Analysis and reporting module 54 may be operated by a marketing user such as 32 of FIG. 1 to understand, for example, how a particular advertisement, or a particular type of advertisement (for example, characterized by one or more advertisement parameters) is made available to any type of user (as emulated by any particular personal-data 59).

In step 70, reporting module 54 may enable the marketing user to determine, by entering or selecting, one or more analysis parameters. Such analysis parameters may be, for example, parameters characterizing one or more applications 17, as determined, for example, in applications database 56 and/or emulation data 57. Such analysis parameters may be, for example, parameters characterizing user types as determined, for example, in personal-data database 59. Such analysis parameters may be, for example, advertising parameters (e.g., an advertisement type) as collected in steps and/or 68.

Reporting module 54 may then proceed to step 71 to analyze the survey results 69 according to the analysis parameters provided or selected in step 70, and then to step 72 to produce the analysis results 73 in a manner legible to the marketing user.

It is expected that during the life of this patent many relevant advertisement systems and applications will be developed and the scope of the terms herein, particularly of the terms "mobile device", "mobile application", "advertisement" or "mobile advertisement", "advertisement bidding", and "bidding agent" or "ad-network", is intended to include all such new technologies a priori.

Additional objects, advantages, and novel features of the embodiments described herein will become apparent to one ordinarily skilled in the art upon examination of the following examples, which are not intended to be limiting. Additionally, each of the various embodiments and aspects of embodiments as delineated hereinabove and as claimed in the claims section below finds experimental support in the following examples.

It is appreciated that certain features of the system and method described herein, which are, for clarity, described in the context of separate embodiments, may also be provided in combination in a single embodiment. Conversely, various features, which are, for brevity, described in the context of a single embodiment, may also be provided separately or in any suitable sub-combination.

Although the system and methods has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A computer-implemented method executed by an internet server, the method comprising the actions of:
   receiving at the internet server, data comprising:
      at least one particular mobile application, wherein the at least one particular mobile application comprises executable code configured to be executed by a processor of a mobile communications device, and wherein the executable code comprises at least one advertisement related code;
      at least one user location for a particular virtual user, the user location comprising a selected geographical location; and
      personal data for simulating the particular virtual user on the internet server;
   monitoring, by the internet server, in real-time, processing of the executable code, the executable code being processed by an emulated mobile communications device on the internet server;
   intercepting, by the internet server, in real-time, a communication generated by the emulated mobile device processing the at least one advertisement related code;
   communicating, by the internet server, in real-time, the intercepted communication to an ad network server via a proxy server, wherein the proxy server is associated with the received user location of the particular virtual user;
   receiving, by the internet server, advertisement data from the ad network server; and
   recording, by the internet server, at least one of:
      advertisement information included in the advertisement data to be displayed by the at least one particular mobile application; and
      parameters associated with the advertisement data.

2. The computer-implemented method according to claim 1, wherein the proxy server emulates at least one of the user location, and a particular cellular network.

3. The computer-implemented method according to claim 1, wherein the personal data comprises at least one of:
   characteristics of the emulated mobile computing device;
   characteristics of the virtual user; and
   behavior of the characteristics of the virtual user.

4. The computer-implemented method according to claim 1, wherein the at least one advertisement related code is configured to perform one or more of the following actions:
  negotiate advertisement information to be displayed;
  communicate an advertisement; and
  display an advertisement.

5. The computer-implemented method according to claim 1, further comprising at least one action of the group of actions comprising:
  detecting when the emulated mobile device begins to process the at least one advertisement related code;
  detecting a predetermined alphanumeric character string generated while processing the at least one advertisement related code;
  detecting an advertisement bidding code generated while processing the at least one advertisement related code;
  detecting an ad call to an ad network server generated while processing the at least one advertisement related code; and
  detecting interaction generated by processing the at least one advertisement related code, wherein the interaction is intended for the ad-network server.

6. The computer-implemented method according to claim 5, wherein the action of intercepting the communication generated by the emulated mobile device processing the advertisement related code is associated with the action of detecting when the emulated mobile device begins to process the at least one advertisement related code.

7. The computer-implemented method according to claim 1, additionally comprising:
  enabling access at least one of: the recorded advertisement information to be displayed, and recorded parameters associated with the advertisement data.

8. The computer-implemented method according to claim 1, wherein the action of intercepting the communication generated by the emulated mobile device processing the at least one advertisement related code additionally comprises at least one of:
  intercepting a communication intended to be transmitted to an ad-network server;
  detecting an alphanumeric character string generated while processing the at least one advertisement related code; and
  detecting an alphanumeric character string comprising "VASTdata" generated while processing the at least one advertisement related code.

9. The computer-implemented method according to claim 1, additionally comprising:
  analyzing the intercepted communication to form advertisement data; and
  simulating activity of the virtual user.

10. A server for receiving advertisement data which would be presented to a mobile computing device in response to a user interacting with a mobile application running on the mobile computing device, the server comprising:
  a processor configured to execute computer programs;
  a user interaction module, which when executed by the processor, is configured to:
    receive at least one particular mobile application, wherein the at least one particular mobile application comprises mobile application code configured to be loaded into a mobile communication device and executed by a mobile communication device processor and further comprises at least one advertisement related code;
    at least one user location for a virtual user, the user location comprising a selected geographical location; and
    personal data for simulating the virtual user; and
  an emulation module, when executed by the processor, is configured to:
    emulate a mobile communication device by processing the mobile application code;
    monitor, in real-time, processing of the mobile application code;
  at least one monitoring module operative to:
    intercept a communication generated when the emulation module processes the advertisement related code;
    communicate the intercepted communication to an ad network server via a proxy server associated with the user location of the virtual user;
    receive advertisement data from the ad network server; and
    record at least one of:
      advertisement information in the advertisement data to be displayed by the at least one particular mobile application; and
      parameters associated with the advertisement data.

11. The server according to claim 10, wherein the proxy server emulates at least one of the user location, and a particular cellular network.

12. The server according to claim 10, wherein the personal data comprises at least one of:
  characteristics of the mobile computing device;
  characteristics of the virtual user; and
  behavior of the characteristics of the virtual user.

13. The server according to claim 10, wherein the advertisement code is configured to perform one or more of the following actions:
  negotiate advertisement display;
  communicate an advertisement; and
  display an advertisement.

14. The server according to claim 10, wherein the emulation module is additionally configured to perform at least one of:
  detect when the emulation module processes advertisement code;
  detect when the advertisement code would generate a predetermined alphanumeric character string;
  detect when the advertisement code would generate an advertisement bidding code;
  detect when the advertisement code would generate an ad call to an ad network server;
  detect when the advertisement code would generate an interaction of the at least one particular mobile application the ad-network server; and
  simulate user activity of the virtual user interacting with the at least one particular mobile application.

15. The server according to claim 10, wherein the emulation module is additionally configured to identify a communication generated when the emulation module processes the advertisement code.

16. The server according to claim 10, additionally configured to enable access to at least one of: the recorded advertisement information in the advertisement data to be displayed, and the recorded parameters associated with the advertisement data.

17. The server according to claim 10, wherein the monitoring module, in addition to being operative to intercept a communication generated when the emulation module processes the advertisement code, is additionally operative to perform at least one of:
- analyze the intercepted communication to form advertisement data;
- identify a communication intended for an ad-network server;
- detect an alphanumeric character string in the identified communication;
- detect an alphanumeric character string in the identified communication wherein the alphanumeric character string comprises the characters "VASTdata".

18. A non-transitory computer readable medium storing computer code executable by a processor to perform a method comprising the actions of:
- receiving at least one particular mobile application, wherein the at least one particular mobile application includes executable code configured to be executed by a processor of a mobile communications device and wherein the executable comprises at least one advertisement related code;
- receiving at least one user location for a particular virtual user, the user location comprising a selected geographical location; and
- receiving personal data for simulating the particular virtual user; and
- processing the executable code by emulating a mobile communications device;
- monitor, in real-time, the processing of the executable code;
- intercepting a communication generated when processing the advertisement related code;
- communicating the intercepted communication to an ad network server via a proxy server associated with the user location of the virtual user;
- receiving advertisement data from the ad network server; and
- recording at least one of:
  - advertisement information in the advertisement; and
  - parameters associated with the advertisement data.

19. The non-transitory computer readable medium according to claim 18, wherein the proxy server emulates at least one of the user location, and a particular cellular network.

20. The non-transitory computer readable medium according to claim 18, wherein the personal data comprises at least one of:
- characteristics the mobile device;
- characteristics of the virtual user; and
- behavior of the characteristics of the virtual user.

21. The non-transitory computer readable medium according to claim 18, wherein the advertisement code is configured to perform one or more of the following actions:
- negotiate advertisement information to be displayed;
- communicate an advertisement; and
- display an advertisement.

22. The non-transitory computer readable medium according to claim 18, further comprising code executable by the processor to perform at least one action of the group of actions comprising:
- detecting when the at least one advertisement related code is being processed;
- detecting a predetermined alphanumeric character string generated while processing the at least one advertisement related code;
- detecting an advertisement bidding code generated while processing the at least one advertisement related code;
- detecting an ad call to an ad network server generated while processing the at least one advertisement related code; and
- detecting interaction generated by processing of the at least one mobile application intended for the ad-network server.

23. The non-transitory computer readable medium according to claim 22, wherein the action of intercepting a communication generated by processing the at least one advertisement related code is associated with the action of detecting when the at least one advertisement is being processed.

24. The non-transitory computer readable medium according to claim 1, further comprising code executable by the processor to perform the action of:
- enabling access at least one of: the recorded advertisement information to be displayed, and recorded parameters associated with the advertisement data.

25. The non-transitory computer readable medium according to claim 18, wherein the action of intercepting the communication additionally comprises at least one of:
- intercepting a communication with an ad-network server;
- detecting an alphanumeric character string generated while processing the at least one advertisement related code; and
- detecting an alphanumeric character string comprising "VASTdata" generated while processing the at least one advertisement related code.

26. The non-transitory computer readable medium according to claim 18, further comprising code executable by the processor to perform the actions of:
- analyzing the intercepted communication to form advertisement data; and
- simulating activity of the virtual user.

* * * * *